(12) United States Patent
St-Amand (10) Patent No.: US 9,704,346 B2
(45) Date of Patent: Jul. 11, 2017

(54) NEWS NETWORKS FOR ONLINE VIDEO GAMES

(71) Applicant: Interprovincial Lottery Corporation, Toronto (CA)

(72) Inventor: Eric St-Amand, New Brunswick (CA)

(73) Assignee: Interprovincial Lottery Corporation, Toronto, Ontario ( * ) Notice: Subject to any disclaimer, the term of this patent is extended or adjusted under 35 U.S.C. 154(b) by 222 days.

(21) Appl. No.: 14/354,264

(22) PCT Filed: Oct. 29, 2012

(86) PCT No.: PCT/CA2012/050770
§ 371 (c)(1),
(2) Date: Apr. 25, 2014

(87) PCT Pub. No.: WO2013/059945
PCT Pub. Date: May 2, 2013

(65) Prior Publication Data
US 2014/0302906 A1 Oct. 9, 2014

Related U.S. Application Data

(60) Provisional application No. 61/552,023, filed on Oct. 27, 2011.

(51) Int. Cl.
*A63F 13/30* (2014.01)
*G07F 17/32* (2006.01)
*A63F 13/63* (2014.01)
*A63F 13/65* (2014.01)
*H04L 12/18* (2006.01)

(52) U.S. Cl.
CPC ............ *G07F 17/329* (2013.01); *A63F 13/12* (2013.01); *A63F 13/63* (2014.09); *A63F 13/65* (2014.09); *H04L 12/1859* (2013.01); *A63F 2300/57* (2013.01)

(58) Field of Classification Search
CPC H04N 21/472; A63F 2300/5546; A63F 13/12
See application file for complete search history.

(56) References Cited

U.S. PATENT DOCUMENTS

| | | | |
|---|---|---|---|
| 2007/0265073 A1* | 11/2007 | Novi | ........................ A63F 13/12 463/35 |
| 2008/0146342 A1 | 6/2008 | Harvey et al. | ................... 463/42 |
| 2008/0176655 A1* | 7/2008 | James | ................. G06F 19/3475 463/42 |
| 2009/0253519 A1* | 10/2009 | Xu | .......................... A63F 13/12 463/42 |

(Continued)

OTHER PUBLICATIONS

Int'l Search Report issued in connection with Int'l Appln. No. PCT/CA2012/050770 on Jan. 29, 2013.

*Primary Examiner* — James S McClellan
*Assistant Examiner* — Kevin Carter
(74) *Attorney, Agent, or Firm* — Fitzpatrick, Cella, Harper & Scinto (57) ABSTRACT

There is described herein an online video game having a news network module for generating news feeds for broadcasting inside and outside of the video game. The news feeds may comprise virtual world news and/or real world news and may be customized as per individual player settings or operator settings.

19 Claims, 12 Drawing Sheets

(56) References Cited

U.S. PATENT DOCUMENTS

| | | | |
|---|---|---|---|
| 2010/0022290 A1* | 1/2010 | Oakes | G07F 17/32 463/17 |
| 2010/0203935 A1 | 8/2010 | Levy et al. | 463/4 |
| 2010/0273553 A1* | 10/2010 | Zalewski | A63F 13/12 463/31 |
| 2011/0107220 A1* | 5/2011 | Perlman | A63F 13/12 715/720 |
| 2011/0159465 A1 | 6/2011 | Gutridge | 434/154 |
| 2012/0178514 A1 | 7/2012 | Schulzke et al. | 463/17 |

* cited by examiner

NEWS NETWORKS FOR ONLINE VIDEO GAMES

CROSS-REFERENCE TO RELATED APPLICATIONS

This application is a national stage entry under 35 U.S.C. §371 of International Application No. PCT/CA2012/050770, filed on Oct. 29, 2012, and claims priority under 35 USC §119(e) of U.S. Provisional Patent Application No. 61/552,023 filed on Oct. 27, 2011, the contents of which are hereby incorporated by reference.

TECHNICAL FIELD

The present invention relates to the field of online interactive gaming, and more particularly to the broadcasting of news within and outside of such games.

BACKGROUND OF THE ART

Online video games have bred many different types of games, some for casual gamers and others for serious games. Such games may be single-player games or multi-player games.

One type of multiplayer video game quickly growing in popularity are the massively multiplayer online (MMO) games, which are capable of supporting hundreds or thousands of players simultaneously. The setting usually consists of a virtual world that continues to exist even after a player exits the world. Player-made changes to the world are usually permanent and may be viewed by other players.

The virtual world may be created to closely mimic the real world, or it may be a fantastic world that differs significantly from the real world in terms of characters, character behaviors, activities, currency, goods, etc. One of the features that makes MMOs so engaging is the ability to create a separate and alternate life that runs in parallel to the player's real life. This alternate life needs to be vast, interesting, full of mystery and opportunity. Players enjoy the ability to share the specific game experience with others and to interact in new and innovative ways.

SUMMARY

There is described herein an online video game having a news network module for generating news feeds for broadcasting inside and outside of the video game. The news feeds may comprise virtual world news and/or real world news and may be customized as per individual player settings or operator settings.

In accordance with a first broad aspect, there is provided a system for executing an online video game, the system comprising: at least one computer server communicable with at least one client computing device over a network, the server having a processor and a memory; a gaming unit stored on the memory and executable by the processor, the gaming unit having program code that when executed, generates an interactive game play instance playable on the client computing device; and a news network module stored on the memory and executable by the processor, the news network module having program code that when executed, generates a game news feed to be broadcast inside the online video game.

In accordance with a second broad aspect, there is provided a computer-implemented method for executing an online video game, the method comprising generating an interactive game play instance playable on a client computing device; and generating a game news feed to be broadcast inside the online video game.

In accordance with a third broad aspect, there is provided a computer readable medium having stored thereon program code executable by a processor for executing an online video game, the program code executable for generating an interactive game play instance playable on a client computing device; and generating a game news feed to be broadcast inside the online video game.

In the present specification, the real world will be understood to mean the world outside of or external to a virtual world. The virtual world refers to a world created for the purposes of allowing players to participate in an online video game. The virtual world may have its own characters, economy, currency, goods, language, etc. The outside news feed will be understood to refer to a news feed intended for broadcast in the real world, whether virtually (i.e. online) or by other means. The game news feed will be understood to refer to a news feed intended for broadcast inside the game to the players playing the game.

The online video game should be understood to include any electronic game that involves interaction with a user interface to generate visual feedback on a display device. The display device may be a raster display device, an LCD monitor, a plasma monitor, a touch screen, or any other type of display device, including smartphones and mobile devices.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
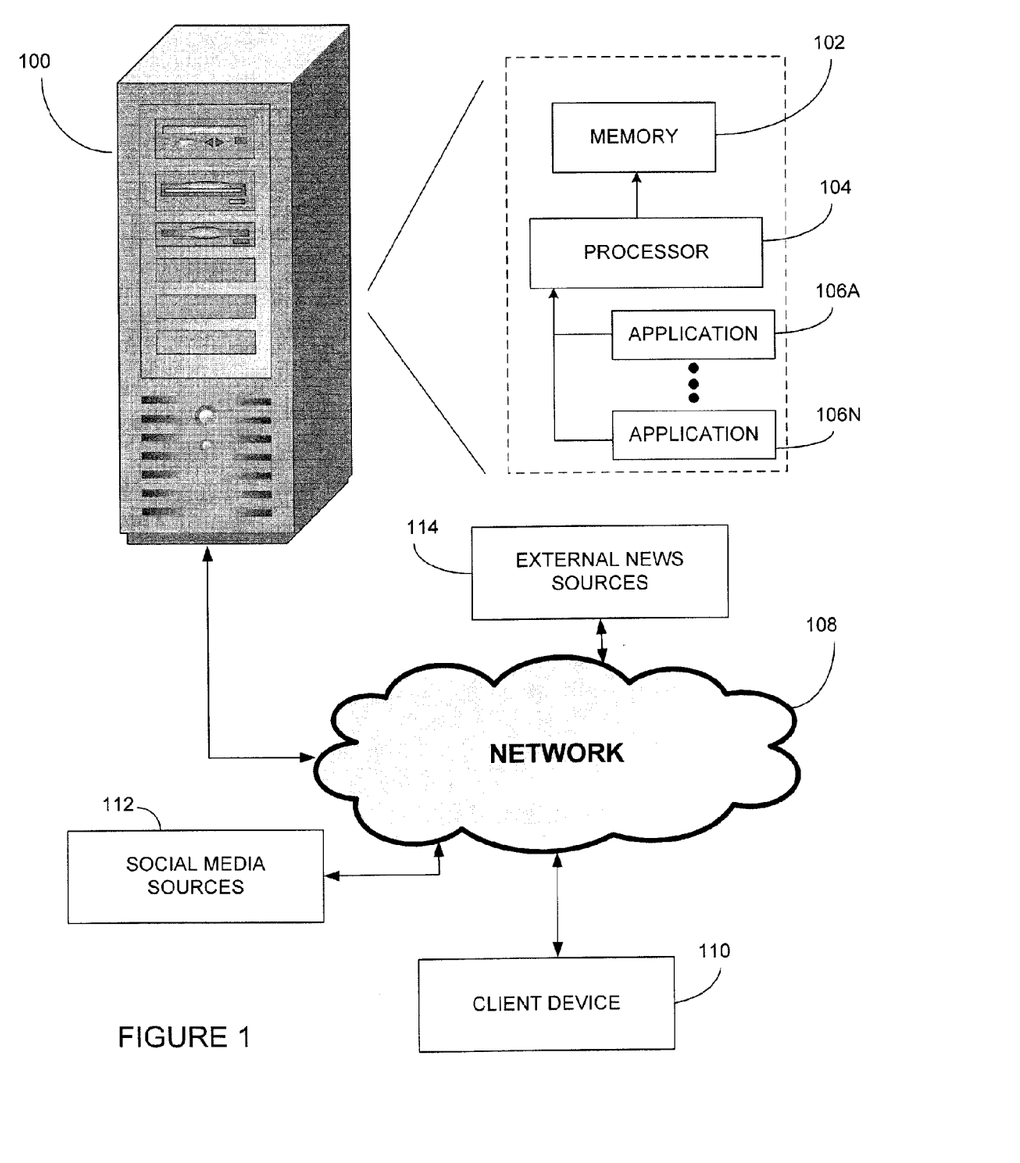
FIG. 1 is a schematic illustration of a system for executing the online video game with an integrated news network, in accordance with one embodiment.

There is described herein an online video game for incorporating a news network therein and providing news from the game to the outside world. The news presented in the news network of the game may be related to the virtual world, the real world, or a combination thereof. The news presented outside of the game may be related to the game itself, or the virtual world existing within the game. FIG. 1 illustrates an exemplary system for executing and hosting the online video game. In the embodiment illustrated, the online video game has lotterized and wagering components embedded therein. A lotterized component refers to the incorporation of lottery-type contests directly into the online video game, such as draws for cash and/or other types of prizes allocated to winners that are redeemable in the real world. A wagering component refers to the ability for a player of the online video game to place a wager against other players inside the game, the winner collecting the wagered amounts. The wagers may have to do with virtual world challenges or real world events. The winnings may be redeemable as cash or prizes in the real world. Other embodiments without these components are also applicable.

One or more server(s) 100 are provided remotely and accessible via a network 108. For example, a series of servers corresponding to a web server, an application server, a database server, and a lottery server may be used. These servers are all represented by server 100 in FIG. 1. The server 100 is accessed by a client device 110, such as a smartphone, a computer, a personal digital assistant (PDA), etc, via any type of network 408, such as the Internet, the Public Switch Telephone Network (PSTN), a cellular network, or others known to those skilled in the art.

The server 100 comprises, amongst other things, a plurality of applications 106a . . . 106n running on a processor 104, the processor being coupled to a memory 102. It should be understood that while the applications 106a . . . 106n presented herein are illustrated and described as separate entities, they may be combined or separated in a variety of ways.

One or more databases (not shown) may be integrated directly into memory 102 or may be provided separately therefrom and remotely from the server 100. In the case of a remote access to the databases, access may occur via any type of network 108, as indicated above. The various databases described herein may be provided as collections of data or information organized for rapid search and retrieval by a computer. They may be structured to facilitate storage, retrieval, modification, and deletion of data in conjunction with various data-processing operations. They may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

In one embodiment, the databases are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). An SSL session may be started by sending a request to the Web server with an HTTPS prefix in the URL, which causes port number "443" to be placed into the packets. Port "443² is the number assigned to the SSL application on the server. Identity verification of a user may be performed using usernames and passwords for all users. Various levels of access rights may be provided to multiple levels of users.

Any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

The memory 102 accessible by the processor 104 receives and stores data. The memory 102 may be a main memory, such as a high speed Random Access Memory (RAM), or an auxiliary storage unit, such as a hard disk, a floppy disk, or a magnetic tape drive. The memory may be any other type of memory, such as a Read-Only Memory (ROM), Electrically Erasable Programmable Read-Only Memory (EEPROM), flash memory (e.g. memory sticks or Secure Digital (SD) cards), or optical storage media such as a videodisc and a compact disc.

The processor 104 may access the memory 102 to retrieve data. The processor 104 may be any device that can perform operations on data. Examples are a central processing unit (CPU), a front-end processor, a microprocessor, a graphics processing unit (GPU/VPU), a physics processing unit (PPU), a digital signal processor, and a network processor. The applications 106a . . . 106n are coupled to the processor 104 and configured to perform various tasks as explained below in more detail. An output may be transmitted to a client device 110.

The Applications 106a . . . 106n may access various social media sources 112 via a network such as network 108. The social media sources may be used to pull real world information therefrom and/or push virtual world information thereto. Real world information originating from social media sources may be related to activities of various users on the social media source, such as news posted on Facebook™ or Twitter™. Such information may be incorporated directly into a news feed inside the virtual world of the online video game. The news feed may be displayed in various ways to the players of the online video game, such as on-demand (via the appropriate links or buttons) or without request. In some embodiments, the news feed may be integrated directly into the game by being displayed on an output device, e.g. a screen or monitor, in various environments of the virtual world such as a television in a gym; in a restaurant, bar, or café; in a virtual goods store; or any other environment where a television/monitor/screen may be found in the context of the virtual world. Alternatively, or in addition to the visual news feed, the news feed may be an audio news feed that is played either on-demand or not. In some embodiments, the audio news feed may be available only in reserved spaces, such as coffee shops or news stores, while in other embodiments, the player may access the audio news feed at any time and from anywhere within the virtual world.

The virtual world news feed may also be supplemented with other external news sources 114, which may also be accessed via a network such as network 108. The external news sources may comprise any source of news from the real world, such as newspapers, magazines, television, radio, Internet, news agencies, and alternative media sources. Other examples of online sources include news networks such as CNN and the BBC, blogs, government websites, corporate websites, weather networks, etc. The news may be related to various topics, such as politics, business, arts, entertainment, fashion, sports, technology, traffic, weather, local news, national news, international news, etc. The news genre may include advocacy, analytic, broadcast, investigative, opinion, photojournalism, scientific, etc. Real world news taken from any one of the above listed sources may be integrated into the online video game. In addition, virtual world news may also be provided via a visual and/or audio news feed inside the game, separately from or combined with the real world news feed.

Figure 2:
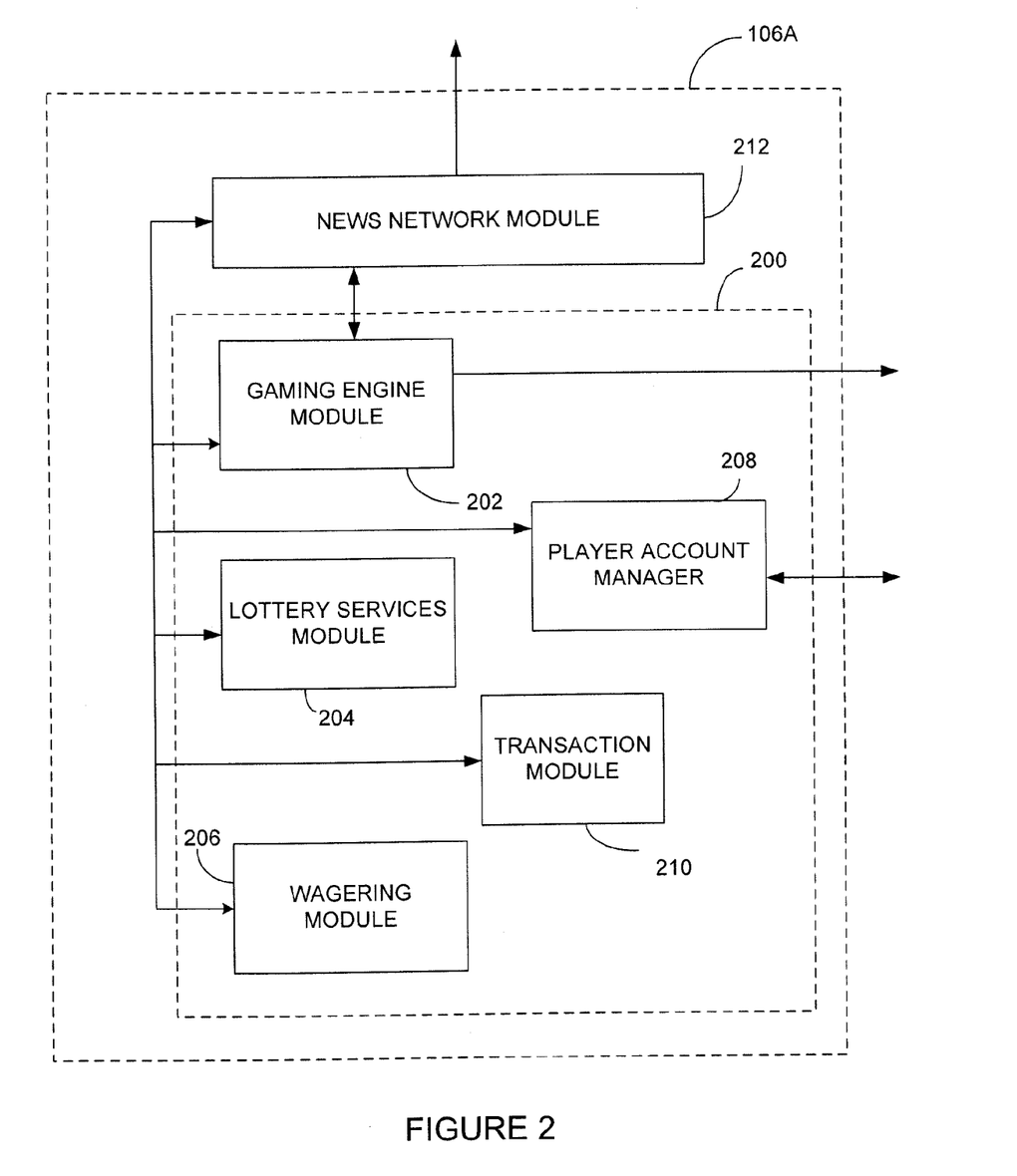
FIG. 2 is a block diagram illustrating an exemplary application running on the processor of the system of FIG. 9.

FIG. 2 illustrates an exemplary application 106a running on the processor 104. In the illustrated embodiment, the application 106a comprises at least a gaming unit 200 and a news network module 212. The gaming unit 200 comprises a gaming engine module 202, a lottery services module 204, and a wagering module 206. These three modules interact together in order to provide the online video game that is executable by the processor 104 over the network 108. The online video game can conduct a lottery transaction within the game by issuing a real lottery ticket from a government sanctioned lottery authority. It can also stake a wager between two players competing against each other in the game play instance, the winner collecting the wagered amount, the winnings being deposited into the winning player's account such that it may later be converted to real world currency. Winnings and/or wagers via the lottery services module 204 and the wagering module 206 are examples of sources of virtual news provided to a news network module 212 for incorporation into a news feed in the virtual world. Such virtual news may also be provided in a news feed in the real world.

A transaction module 210 is involved in the real world transactional aspects of the game. Real world transactions may occur when players purchase virtual currencies and when players redeem virtual winnings or currencies for cash or other real world prizes via the integrated lotteries and wagering. Alternatively, redeeming of virtual winnings for real world cash or prizes may be handled externally to the transaction module 210, such as in the player account manager 208. The transaction module 210 may interact with the lottery services module 204 and the wagering module 206 to manage the transactions. The transaction module 210 may also interact with a player account manager 208.

Figure 3:
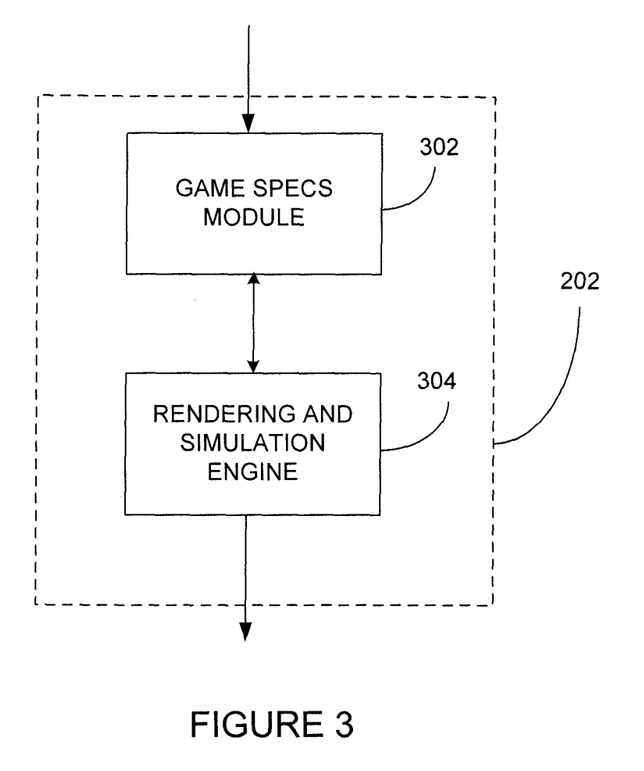
FIG. 3 is a block diagram illustrating an exemplary gaming engine module for the application of FIG. 2.

The gaming engine module 202 is a flexible and reusable software platform which provides all the core functionality needed to execute a game application. This module may be responsible for all aspects of the lotterized game. FIG. 3 is a simplified block diagram of an exemplary embodiment of the gaming engine module 202. A game specs module 302 contains specific gaming logic and instructs a rendering and simulation engine 304 to create the virtual world and render images in accordance with this logic. For example, if a player finishes a first level and wishes to continue to a second level, the game specs module 302 will instruct the rendering and simulation engine 304 to display the second level of the game. In another example, when a given action occurs in a game, such as the player launching a given weapon, the game specs module 302 will instruct the rendering and simulation engine 304 to render the appropriate graphics and display these graphics within the simulated gaming environment. For simplicity, other features of the gaming engine module 202 typically present in such a software platform are not illustrated. Examples of these other features relate to functionalities such as collision detection (and collision response), sound, scripting, animation, artificial intelligence, networking, streaming, memory management, threading, localization support, and a scene graph. These functionalities will be readily understood to be included in the present description by a person skilled in the art.

In some embodiments, the game specs module 302 may receive instructions from the news network module 212 to incorporate virtual and/or real world news into the game. The rendering and simulation engine 304 will then render the appropriate images in accordance with the received instructions in order to integrate the news feed into the game. The rendering and simulation engine 304 may also render the appropriate sounds for audio news feeds, as required. In some embodiments, the gaming engine module 202 may also send virtual world news to the new network module 212 for pushing out to external sources, such as social media sources 112 and other external news sources 114. Examples of virtual world news provided by the gaming engine module 202 include milestones and/or achievements related to the game itself, such as points gathered, levels reached, records broken, etc. This news may be broadcast outside of the game to users of social media or via other news sources.

Figure 4:
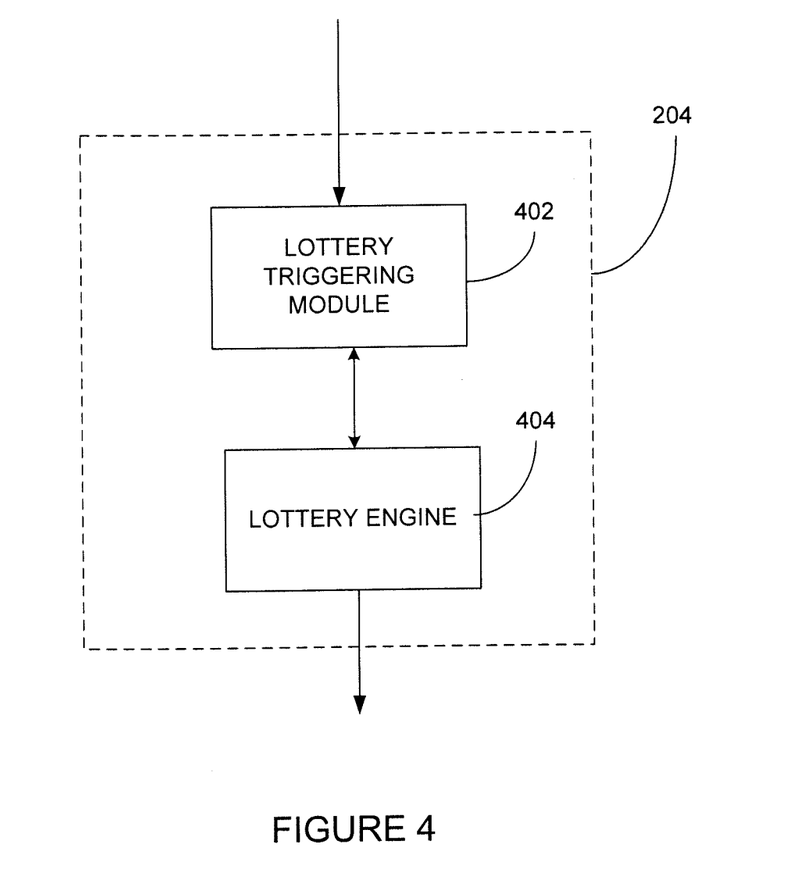
FIG. 4 is a block diagram illustrating an exemplary lottery services module for the application of FIG. 2.

Referring back to FIG. 2, the lottery services module 204 is responsible for all aspects of the lotterized video game that relate directly to lotterized features incorporated into the video game. FIG. 4 is a simplified exemplary embodiment of the lottery services module 204. A lottery triggering module 202 manages the real world lotteries run during the online video game and cooperates with a lottery engine 204, which is responsible for the actual draws and validating of wins. Alternatively, only virtual lotteries are managed by the lottery services module 204 and real world lotteries are managed externally to the present system by a government regulated organization. In such a case, the lottery services module 204 may act as an interface between the present system and the external government regulated organization for real world lotteries, without exercising direct control on such lotteries.

The lottery services module 204 feeds into the news network module 212 in order to provide up-to-date or real time information regarding lottery winners, jackpots, prizes, etc. In some embodiments, this information is integrated into the virtual news feed of the virtual world such that players of the virtual world may be informed of winners, jackpots, prizes, etc on an on-going basis. In some embodiments, the information is pushed to external and social media news sources for distribution outside of the virtual world. In some embodiments, the information is provided to both the virtual world and the real world.

Figure 5:
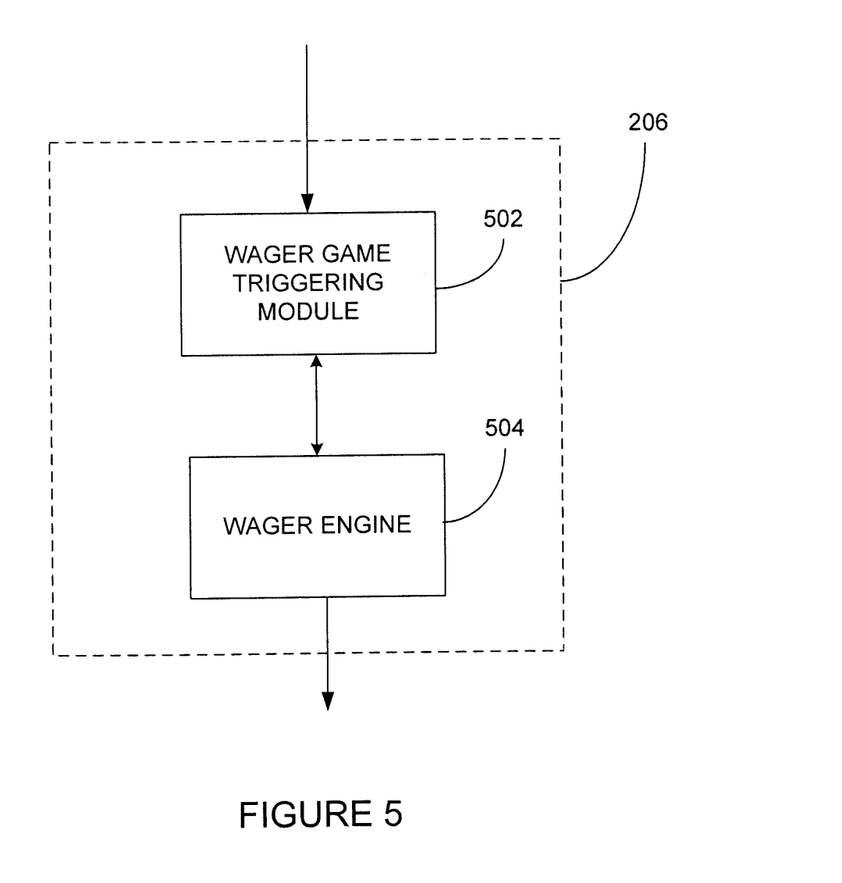
FIG. 5 is a block diagram illustrating an exemplary wagering module for the application of FIG. 2.

FIG. 5 is a simplified exemplary embodiment of the wagering module 206. A wagering game triggering module 502 manages the wagers that are placed by players with other players in the virtual world. A wager engine 504 is responsible for locking in the wager once the challenge has been accepted and allocating the winnings to the winner of the battle. The wagering module 206 may also feed into the news network module 212 in order to provide up-to-date or real time information regarding wagers and outcomes. In some embodiments, this information is integrated into the virtual news feed of the virtual world such that players of the virtual world may be informed of wagers and outcomes on an on-going basis. In some embodiments, the information is pushed to external and social media news sources for distribution outside of the virtual world. In some embodiments, the information is provided to both the virtual world and the real world.

Figure 6:
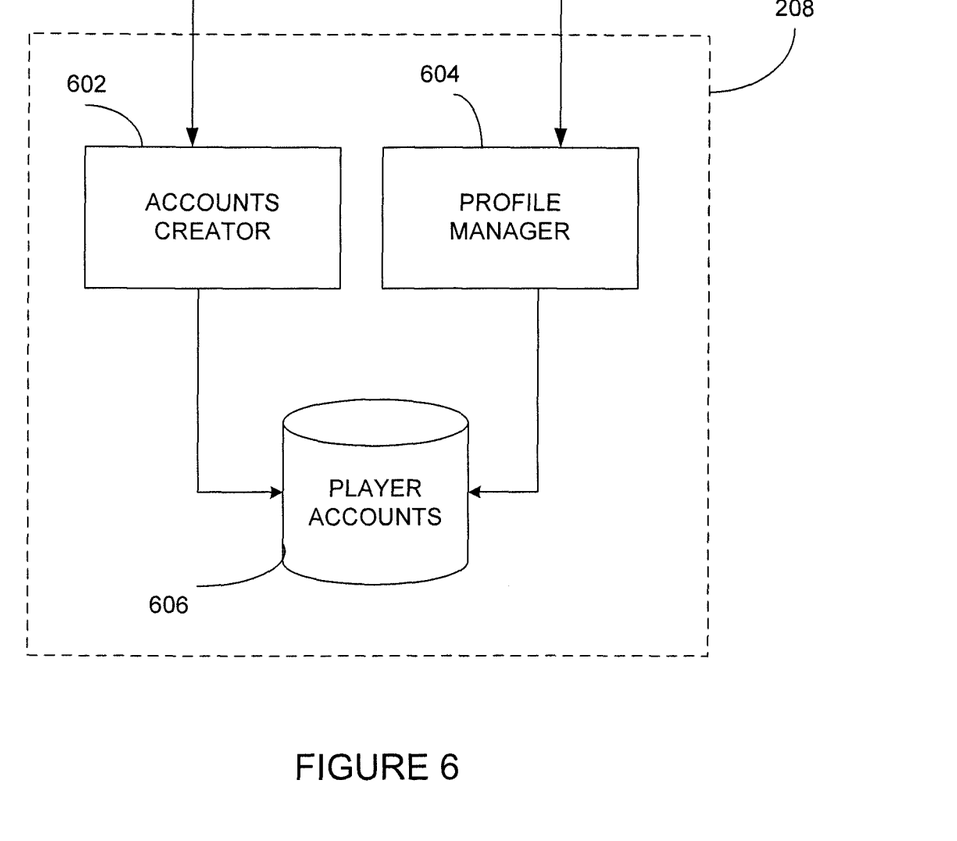
FIG. 6 is a block diagram illustrating an exemplary player account manager for the application of FIG. 2.

FIG. 6 illustrates in more detail the player account manager 208 of FIG. 2. An accounts creator 602 handles the creation of the account, acquisition of personal information of the player, acquisition of financial information of the player, and the general creation of a player profile. The player accounts/profiles are maintained in a database 606 and updated by a profile manager 604. The profile manager 604 will update the player accounts 606 whenever new information is available for a player. The new information may have to do with game statistics, updated personal information, updated financial information, leader board data, prizes won, etc. The player account manager 208 may interact with the news network module 212 in the case of particular settings for individual player accounts for news feeds, as will be explained in more detail below. In some embodiments, the player account manager 208 may be responsible for managing player account functions, such as creating a player account, validating an existing player's login and password or a new player's eligibility to play the game, suspending a player's account, activating a player account, creating a player profile, viewing a player profile, viewing a current balance of a player's real money in a player account, updating a current balance of a player's real money account, and updating a player's virtual ranking/status.

Figure 7:
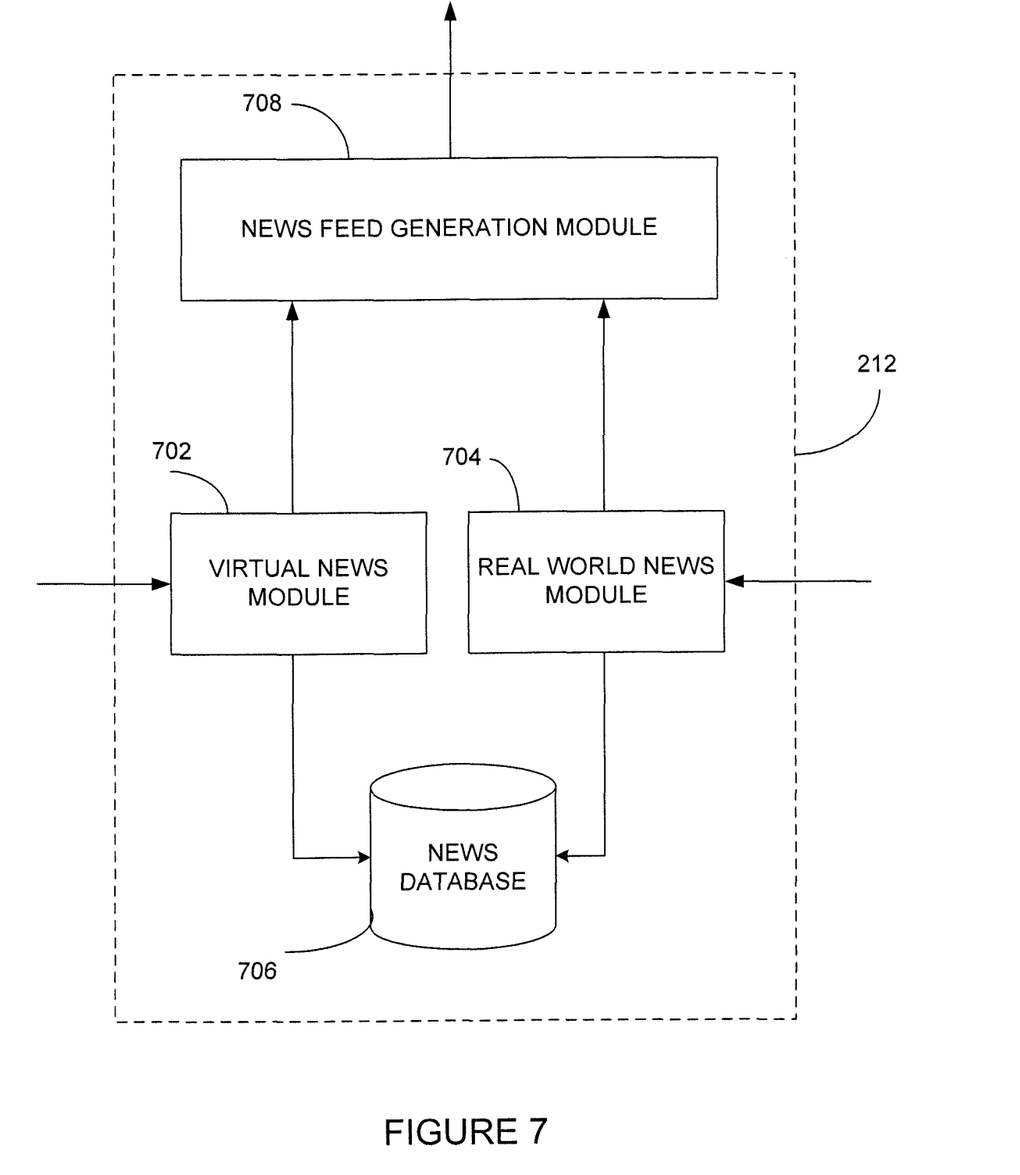
FIG. 7 is a block diagram illustrating an exemplary news network module for the application of FIG. 2.

Reference is now made to FIG. 7, which illustrates an exemplary embodiment of the news network module 212. A virtual news module 702 receives information from the various modules participating in the implementation and operation of the virtual world. A real world news module 704 receives information from outside of the virtual world of the video game. Virtual news and/or real world news may be stored in one or more news databases 706, for future use or reference. A news feed generation module 708 receives the real world news and the virtual world news and generates the news feeds for the real world and the virtual world in accordance with a set of parameters. The parameters may be predetermined or they may be set and/or modified by a game operator. As per the exemplary embodiment illustrated in FIG. 8, the news feeds intended for outside of the game, such as social media and other media, may be formatted separately from news feeds intended for the virtual world. An outside news feed formatting unit 802 receives the virtual world news from the various game sources and generates an appropriate news feed for any given outside news source. A game news feed formatting unit 804 receives both virtual world news and real world news and generates an appropriate news feed for any given virtual world news source.

Figure 8:
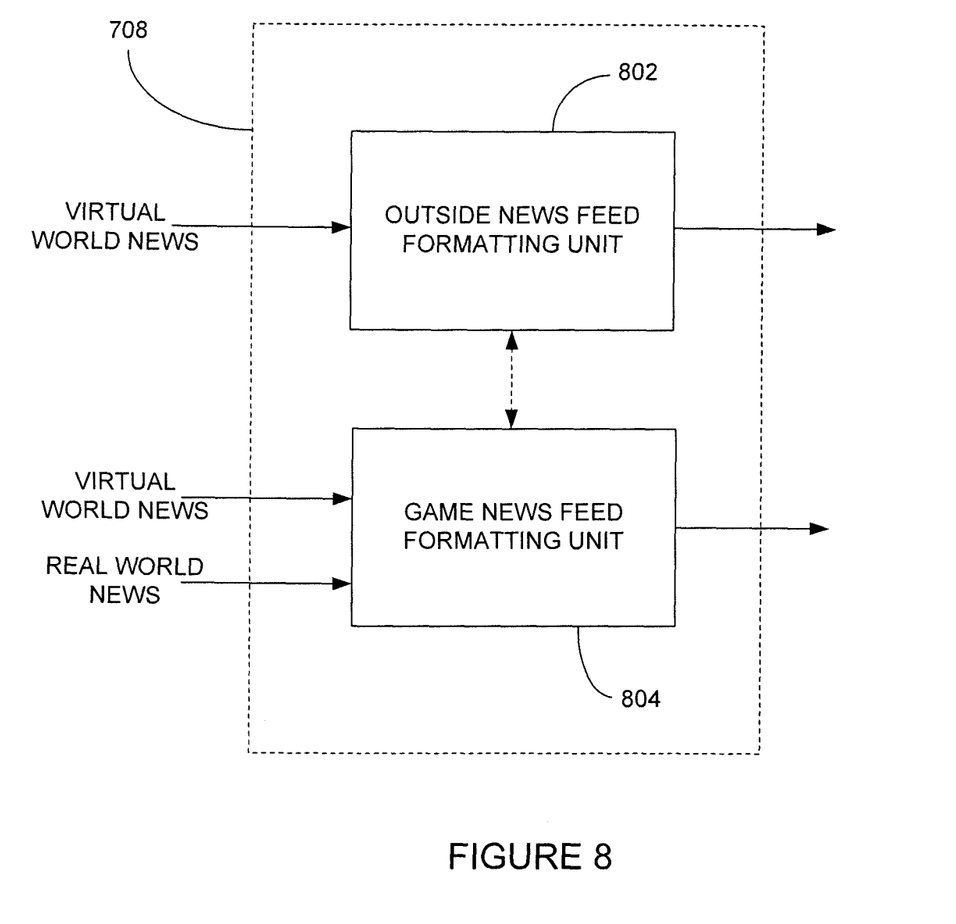
FIG. 8 is a block diagram illustrating an exemplary embodiment of the news network module of FIG. 7.

In some embodiments, the outside news feed formatting unit 802 and game news feed formatting unit 804 may interact to share data and provide uniform formats to their news feeds. In some embodiments, the outside news feed and/or the game news feed may be activated/deactivated as per game settings by a game operator and/or the player(s).

In one exemplary embodiment, the outside news feed is provided to Facebook™ and uploaded to the Facebook™ page of the online video game player. In this embodiment, any achievements, winnings, prizes, records, etc, of players are directly broadcast on a given player's Facebook™ page. In an alternative embodiment, the outside news feed is broadcast on a Facebook™ page of the online video game, or directly to authorized Facebook™ members for any given player of the online video game. For example, a player may set his playing account to broadcast the news feed to all of his Facebook™ "friends", or a subset thereof. In another exemplary embodiment, the outside news feed is broadcast on a Twitter™ feed associated to a given player or a general Twitter™ feed for the online video game.

In some embodiments, the outside news feed is personalized for each player and the broadcast settings are also personalized. For example, player A may choose to have news related only to cash winnings broadcast, and the player A personalized news feed may be set to broadcast only on Twitter™. Player B may choose to have news related to himself and a limited number of other players broadcast, and the player B personalized news feed may be set to broadcast on a personal website of Player B. Player C may choose to have any news related to himself as a player in the game broadcast to any available outside news sources. Various other embodiments for personalizing news feeds and broadcast settings will be readily understood.

In one exemplary embodiment, the game news feed seamlessly incorporates virtual world news and real world news together. For example, a fake evening news segment may include real world news of the day, such as the outcome of an election or the local traffic report, as well as the most recent jackpot winners of virtual lotteries and leaders of the game. This integration is provided by the game news feed formatting unit 804 which formats the news feed as per given settings. In an alternative embodiment, the virtual world news and real world news are provided separately as a function of settings such as environment, player request, news source, and other criteria that may be used to determine which one of real world news and virtual world news is to be broadcast at any given time. In one exemplary embodiment, the player is asked to choose between real world news and virtual world news. In another exemplary embodiment, real world news and virtual world news are provided in different formats. For example, real world news is displayed in a streaming feed across the bottom of a screen while virtual world news is broadcast audibly. In another example, real world news is provided via virtual newspapers or television programming while virtual world news is provided as a permanent feature displayed to all players. In yet another embodiment, real world news and virtual world news are provided side by side or in parallel. Various other embodiments for distinguishing between real world news and virtual world news will be readily understood.

In some embodiments, the settings for news feeds inside the virtual world are the same for all players, while in other embodiments, game news feeds may also be personalized. For example, Player A may choose to have his virtual news seamlessly integrated with real world news. Player B may choose to obtain real world news related exclusively to sports and weather reports. Player C may choose to have virtual world news related to predetermined players provided to him, in a streaming feed across the bottom of his screen, and no real world news.

The news feed generation module 708 may therefore be adapted to personalize outside news feeds and/or inside news feeds with regards to the type of news being broadcast, the format in which it is broadcast, and to whom it may be broadcast. Players may be allowed to customize their news feeds when setting up their accounts, and modify these settings at any time.

Figure 9A:
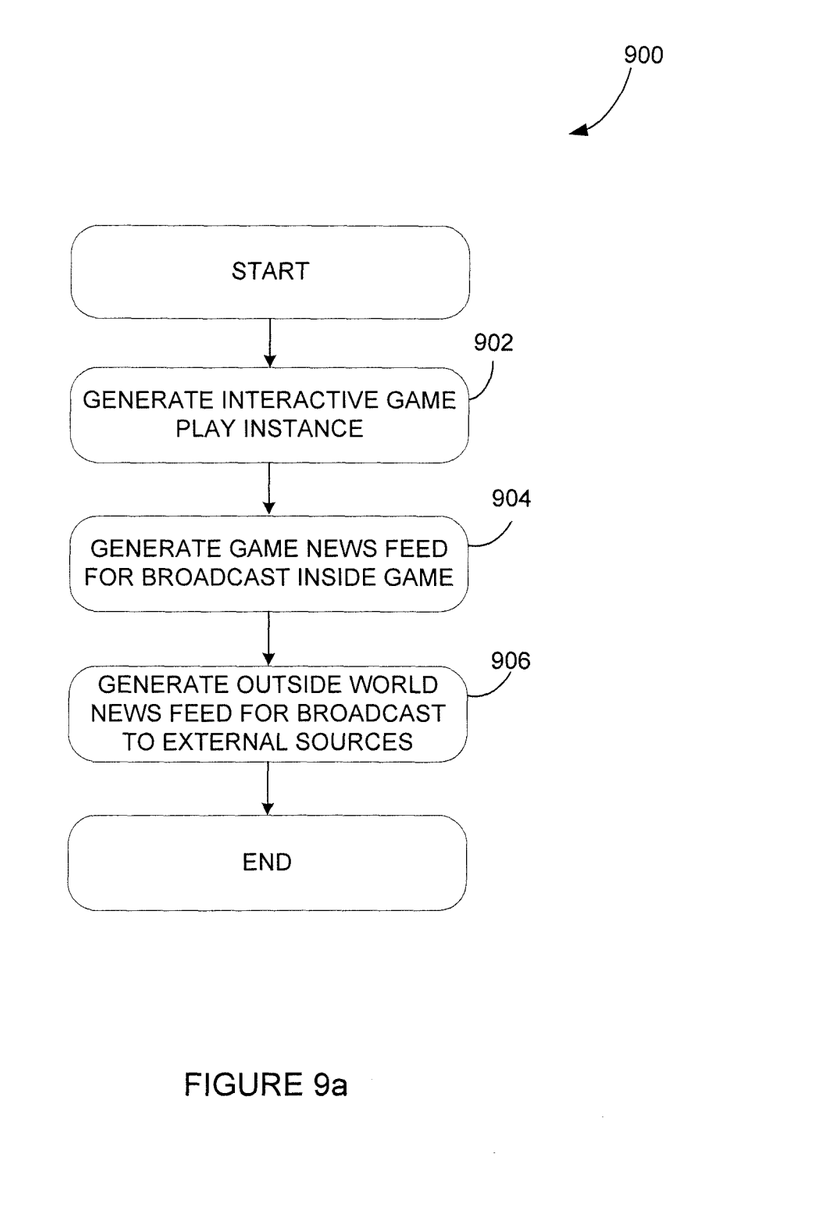
FIG. 9a is a flowchart of a method for executing the online video game with an integrated news network, in accordance with one embodiment.

Referring now to FIG. 9*a*, a method 900 for executing the online video game with an integrated news network will now be described. The method 900 illustratively comprises generating at step 902 an interactive game play instance for the online video game, generating at step 904 a game news feed for broadcast inside the game, and generating at step 906 an outside world news feed for broadcast to external sources, e.g. social media sources. As discussed above, the generated feeds may be customized according to player settings or other parameters.

Figure 9B:
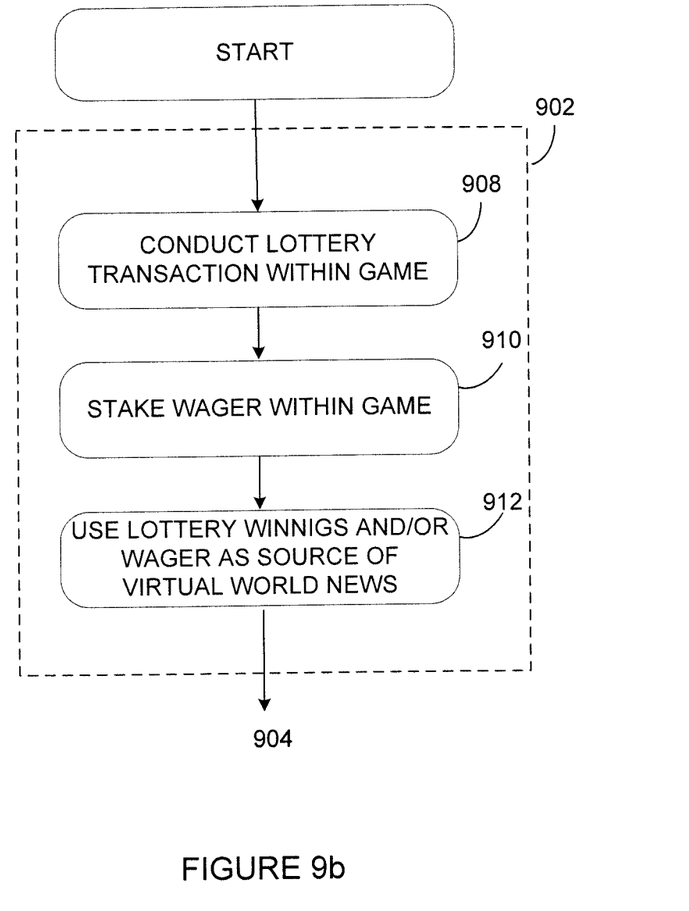
FIG. 9b is a flowchart of the step of FIG. 9a of generating an interactive game play instance.

Referring to FIG. 9b, the step 902 of generating an interactive game play instance for the online video game illustratively comprises executing at step 908 a game application to generate the game play instance. A lottery transaction may then be conducted within the game at step 910. The next step 912 may comprise optionally staking a wager within the game.

Figure 9C:
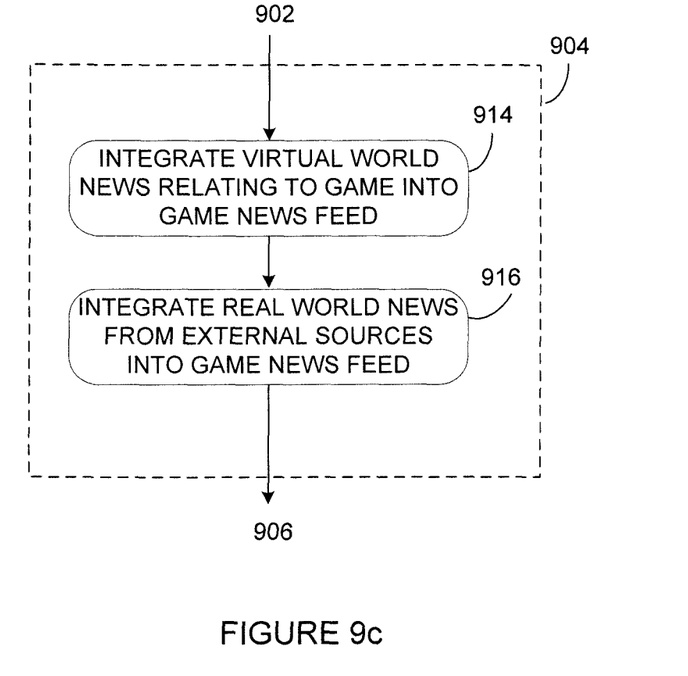
FIG. 9c is a flowchart of the step of FIG. 9a of generating a game news feed for broadcast inside the game.

Referring to FIG. 9c, the step 904 of generating a game news feed for broadcast inside the game illustratively comprises using at step 914 information about the game play instance, the lottery winnings, and/or the wager as a source of virtual world news. The virtual world news relating to the game may then be integrated at step 916 into the game news feed. Real world news from external sources may further be integrated at step 918 into the game news feed.

Figure 9D:
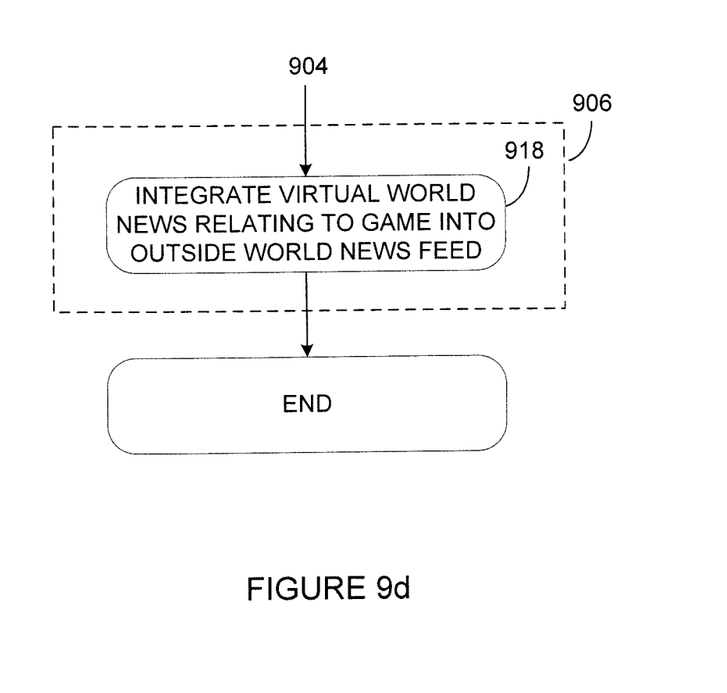
FIG. 9d is a flowchart of the step of FIG. 9a of generating an outside world news feed for broadcast to external sources.

Referring to FIG. 9d, the step 906 of generating an outside world news feed for broadcast to external sources illustratively comprises integrating at step 920 the virtual world news relating to the game into the outside world news feed.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

The invention claimed is:

1. A system for executing an online video game, the system comprising:
    at least one computer server communicable with at least one client computing device over a network, the server having a processor and a memory;
    a gaming unit stored on the memory and executable by the processor, the gaming unit having program code that when executed, generates an interactive game play instance playable on the client computing device, the interactive game play instance rendering an environment of a virtual world; and
    a news network engine stored on the memory and executable by the processor, the news network engine having program code that when executed, generates a game news feed to be broadcast inside the environment of the virtual world;
    wherein the game news feed comprises virtual world news relating to the interactive game play instance and real world news received from outside of the interactive game play instance,
    wherein the gaming unit comprises program code of a lottery services engine executable by the processor for conducting a lottery transaction within the interactive game play instance and program code of a wagering engine executable by the processor for staking at least one wager within the virtual world, and real time information about winnings via the lottery services engine and about the at least one wager are provided to the news network engine for incorporation into at least one of the game news feed and an outside world news feed, and
    wherein the games news feed is provided on a virtual output device in the environment of the virtual world.

2. The system of claim 1, wherein the game news feed comprises at least two separate news feeds including a first news feed for the virtual world news and a second news feed for the real world news.

3. The system of claim 1, wherein the news network unit comprises program code that when executed, generates the outside world news feed to be broadcast outside the online video game, the outside world news feed comprising the virtual world news relating to the interactive game play instance and at least the real time information about winnings from the lottery services engine and about the at least one wager.

4. The system of claim 1, wherein the news network engine comprises program code that when executed, generates a player customized game news feed in accordance with player settings.

5. The system of claim 4, wherein the news network engine comprises program code that when executed, generates a player customized outside world news feed in accordance with the player settings.

6. The system of claim 3, wherein the news network engine comprises program code that when executed accesses a plurality of social media sources for pulling the real world news from the plurality of social media sources for incorporation into the game news feed and/or pushing the virtual world news to the plurality of social media sources through the outside world news feed.

7. The system of claim 3, wherein the news network engine comprises program code of a game news feed formatting engine executable by the processor to format the virtual world news and/or the real world news for incorporation into the game news feed and program code of an outside news feed formatting engine executable by the processor to format the virtual world news for incorporation into the outside world news feed.

8. The system of claim 7, wherein the news network engine comprises program code that when executed causes the game news feed formatting engine to communicate with the outside news feed formatting engine for providing a uniform format to the game news feed and the outside world news feed.

9. The system of claim 2, wherein the game news feed comprises at least one of a visual news feed and an audio news feed that is rendered on at least one output device found in a virtual environment of the interactive game play instance.

10. A computer-implemented method for executing an online video game, the method comprising:
    generating an interactive game play instance playable on a client computing device, the interactive game play instance rendering an environment of a virtual world;
    generating a game news feed to be broadcast inside the online video game, the game news feed combining virtual world news relating to the interactive game play instance and real world news received from outside of the interactive game play instance;
    generating an outside world news feed to be broadcast outside the online video game, the outside world news feed comprising the virtual world news relating to the interactive game play instance; and
    conducting a lottery transaction within the interactive game play instance and program code of a wagering engine executable by the processor for staking at least one wager within the virtual world, and real time information about winnings via the lottery services engine and about the at least one wager are provided to the news network engine for incorporation into at least one of the game news feed and an outside world news feed, wherein the games news feed is provided on a virtual output device in the environment of the virtual world.

11. The method of claim 10, wherein generating the game news feed comprises generating at least two separate news feeds including a first news feed for the virtual world news and a second news feed for the real world news.

12. The method of claim 10, further comprising generating the outside world news feed to be broadcast outside the online video game, the outside world news feed comprising the virtual world news relating to the interactive game play instance and at least the real time information about winnings from the lottery services engine and about the at least one wager.

13. The method of claim 10, further comprising generating a player customized game news feed in accordance with player settings.

14. The method of claim 13, further comprising generating a player customized outside world news feed in accordance with the player settings.

15. The method of claim 12, further comprising accessing a plurality of social media sources for pulling the real world news from the plurality of social media sources for at least one of (i) incorporation into the game news feed and (ii) pushing the virtual world news to the plurality of social media sources through the outside world news feed.

16. A computer readable medium having stored thereon program code executable by a processor for executing an online video game, the program code executable for:

generating an interactive game play instance playable on a client computing device; and generating a game news feed to be broadcast inside the online video game, wherein generating the game news feed comprises combining virtual world news relating to the interactive game play instance and real world news received from outside of the interactive game play instance; and conducting a lottery transaction within the interactive game play instance and program code of a wagering engine executable by the processor for staking at least one wager within the virtual world, and real time information about winnings via the lottery services engine and about the at least one wager are provided to the news network engine for incorporation into at least one of the game news feed and an outside world news feed, wherein the games news feed is provided on a virtual output device in the environment of the virtual world.

17. The system of claim 1, wherein the games news feed and the outside world news feed are provided in different formats and wherein in the interactive game play instance, the virtual world news is displayed in a streaming feed across a bottom of a screen and the real world news is broadcast audibly.

18. The system of claim 1, wherein the game news feed provides real-time lottery information on an on-going basis.

19. The system of claim 7, wherein the games news feed formatting engine is configured to integrate the real world news, the real-time information about winnings and the virtual world news into a single virtual news segment that is incorporated into at least one of the games news feed and the outside world news feed, the single virtual news segment being provided on the virtual output device in the environment of the virtual world.

* * * * *